United States Patent [19]

Amendt et al.

[11] Patent Number: 6,033,340
[45] Date of Patent: Mar. 7, 2000

[54] METHOD OF AND APPARATUS FOR OPERATING A TORQUE TRANSMITTING SYSTEM IN THE POWER TRAIN OF A MOTOR VEHICLE

[75] Inventors: Oliver Amendt, Bühl-Vimbuch; Michael Salecker, Bühl, both of Germany

[73] Assignee: LuK Getriebe-Systeme GmbH, Buhl/Baden, Germany

[21] Appl. No.: 08/858,828

[22] Filed: May 19, 1997

[30] Foreign Application Priority Data

May 24, 1996 [DE] Germany .......................... 196 21 106

[51] Int. Cl.[7] .............................. B60K 41/28; B60K 41/02
[52] U.S. Cl. ............................... 477/77; 477/110; 477/83; 192/3.58
[58] Field of Search .................................. 477/77, 78, 79, 477/80, 83, 110; 74/335, 336 R; 192/3.58, 3.63

[56] References Cited

U.S. PATENT DOCUMENTS

| | | | |
|---|---|---|---|
| 4,513,638 | 4/1985 | Nishikawa et al. ................ | 192/3.58 X |
| 4,618,042 | 10/1986 | Yamamoto .......................... | 192/3.58 X |
| 5,020,645 | 6/1991 | Sasa ..................................... | 192/3.63 X |
| 5,060,768 | 10/1991 | Yamashita et al. ................. | 192/3.58 X |
| 5,099,969 | 3/1992 | Ohtake ................................ | 192/3.58 X |
| 5,293,316 | 3/1994 | Slicker ................................. | 477/86 X |
| 5,333,709 | 8/1994 | Bulgrien ................................. | 74/335 |
| 5,460,580 | 10/1995 | Streib ..................................... | 477/110 |
| 5,529,548 | 6/1996 | Mack .................................. | 477/110 X |
| 5,681,242 | 10/1997 | Bates ................................... | 477/176 X |

*Primary Examiner*—Charles A. Marmor
*Assistant Examiner*—Scott Lund
*Attorney, Agent, or Firm*—Darby & Darby

[57] ABSTRACT

A motor vehicle wherein the clutch is automatically engaged to initiate a creeping movement of the vehicle when the engine is on, the transmission is in gear, the gas pedal is not depressed and the brake or brakes is or are not applied. This entails or takes place at least substantially simultaneously with an increase of the engine torque. If the creeping movement is interrupted, e.g., as a result of the application of a brake, the clutch is disengaged and the engine torque is reduced.

29 Claims, 4 Drawing Sheets

METHOD OF AND APPARATUS FOR OPERATING A TORQUE TRANSMITTING SYSTEM IN THE POWER TRAIN OF A MOTOR VEHICLE

BACKGROUND OF THE INVENTION

The invention relates to motor vehicles in general, and more particularly to improvements in motor vehicles with power trains which embody automated transmissions and/or automated torque transmitting systems. The invention also relates to improvements in methods of operating motor vehicles which embody power trains of the above outlined character.

It is known to provide a motor vehicle with an electronic, mechanical or fluid-operated actuator for an automated torque transmitting system, such as a friction clutch, a magnetic powder clutch or a hydrokinetic torque converter with a bypass or lockup clutch. An automated torque transmitting system (hereinafter called clutch or friction clutch for short) can be installed between the prime mover (such as an internal combustion engine or a hybrid structure employing an electric motor) and the (manual, automated or automatic) change speed transmission or between the output element of the transmission and one or more driven units (e.g., a differential). The so-called actor of the actuator for the clutch can transmit motion to a fork, lever, bearing or any other suitable component which serves to partially or fully engage or disengage the clutch.

The actuator receives, or can receive, signals from one or more sensors, switches and/or electrical or electronic circuits and processes such signals to operate the aforementioned actor which selects the condition (i.e., the extent of engagement or disengagement) of the clutch accordingly. The circuit(s) which is(are) operatively connected with the actuator can include an electronic circuit for the prime mover in the power train of the motor vehicle; such circuit can control or regulate the torque which the output element of the prime mover transmits, e.g., to a single or to a composite flywheel of the clutch.

The vehicle can be caused to carry out a so-called creeping (i.e., slow or gradual) movement in response to appropriate engagement of the clutch while the engine is on. If such creeping movement is caused to take place while the gas pedal is not depressed, while the transmission is in a gear other than neutral, and while the vehicle brake(s) is(are) not operated, this affects the engine in that the engine is stressed and its output is reduced at an inopportune time. This, in turn, entails a reduction of the RPM of the engine below the idling RPM before the idling speed regulator of the engine control electronics can effect an increase of the rotational speed back to the desired or optimum idling RPM.

The just outlined inopportune stressing of the engine, the resulting reduction of the engine RPM, and the subsequent increase of such RPM (e.g., to the desired or required idling RPM) are highly undesirable on several grounds. For example, such variations of the engine RPM can result in the generation of readily detectable noise and can also be a cause of other discomfort to the occupant or occupants of a motor vehicle and/or can affect the fuctioning or operation of the motor vehicle.

OBJECTS OF THE INVENTION

An object of the invention is to provide a motor vehicle which is constructed and assembled and which can be operated in such a way that it can reliably overcome the aforediscussed drawbacks of conventional motor vehicles having power trains including automated torque transmitting systems.

Another object of the invention is to provide a motor vehicle wherein the operation of the engine while the vehicle performs a creeping movement is more satisfactory than in conventional motor vehicles.

A further object of the invention is to enhance the comfort to the occupants of a motor vehicle while the vehicle is caused to carry out a creeping movement.

An additional object of the invention is to provide a novel and improved method of enhancing the operation of a motor vehicle in a simple and inexpensive manner.

Still another object of the invention is to provide a novel and improved actuator for the automated torque transmitting system in the power train of a motor vehicle.

A further object of the invention is to provide a motor vehicle with a novel and improved power train.

Another object of the invention is to provide a motor vehicle with a novel and improved combination of engine, automated clutch and actuator for the clutch.

An additional object of the invention is to provide a motor vehicle with a novel and improved combination of engine, automated clutch, clutch actuator and transmission.

A further object of the invention is to provide a motor vehicle with a novel and improved combination of engine, automated clutch, automated or automatic transmission, and actuator for the clutch and/or transmission.

SUMMARY OF THE INVENTION

One feature of the present invention resides in the provision of a motor vehicle which comprises a power train including an adjustable energy-consuming prime mover (such as a fuel-consuming internal combustion engine) which is arranged to transmit a variable torque, an automated torque transmitting system which is actuatable to assume engaged and disengaged conditions (preferably including a number of partially engaged conditions), and a transmission which is shiftable into a plurality of gears. The motor vehicle further comprises means (e.g., an electronic circuit) for varying the torque of the prime mover, at least one brake, means (such as a gas pedal) for selecting the consumption of energy by the prime mover, and means for actuating the torque transmitting system. The at least one brake and the energy consumption selecting means have idle and operative conditions and the actuating means includes means (such as an electromagnetic, fluid-operated or mechanical actor) for engaging the torque transmitting system for the transmission of a predeterminable torque which entails a creeping movement of the vehicle while the prime mover transmits torque, while the at least one brake and the energy consumption selecting means are idle, and while the transmission is in gear. The means for varying the torque being transmitted by the prime mover is operative to increase the torque being transmitted by the prime mover when the torque transmitting system is engaged to induce the creeping movement of the motor vehicle.

The means for varying the torque of the prime mover can include means for effecting a predetermined increase of the torque being transmitted by the prime mover when the torque transmitting system is engaged to induce the creeping movement of the motor vehicle.

The motor vehicle further comprises one or more sensors having means for generating and for transmitting to the torque varying means and/or to the actuating means signals which denote at least one variable parameter of the prime mover, of the torque transmitting system (such as a friction clutch or a magnetic powder clutch or a hydrokinetic torque converter with a bypass clutch), of the transmission, of the wheels and/or others.

The means for engaging the torque transmitting system (such as the aforementioned actor) can be provided with means for effecting the transmission by the torque transmitting system of a predetermined torque which entails the creeping movement of the motor vehicle.

The predeterminable torque can at least approximate the torque being transmitted by the prime mover when the torque transmitting system is engaged to induce the creeping movement of the motor vehicle.

The transmission can constitute a manually shiftable transmission or an automated transmission; if the transmission is automated, the actuating means can further comprise adjustable means (e.g., one or more additional actors) for shifting the automated transmission and means for controlling the shifting means (such means for controlling can include or constitute or form part of the aforementioned means for actuating the torque transmitting system).

The means for actuating the torque transmitting system can include means (e.g., a bus or another suitable signal transmitting connection) for initiating a torque regulating action by the means for varying the torque of the prime mover.

The means for varying the torque of the prime mover can be designed to increase the torque being transmitted by the prime mover in a single step or in a plurality of steps (and at least two steps of such plurality of steps can be at least substantially identical). The single step or at least one of a plurality of steps can have a magnitude (such as duration, length and/or width) which is a function of the operating point of a component of the motor vehicle (such as the prime mover and/or the torque transmitting system).

Another feature of the invention resides in the provision of a motor vehicle comprising a power train which includes an adjustable energy-consuming prime mover arranged to transmit a variable torque, an automated torque transmitting system which is actuatable to assume engaged and disengaged (including a plurality of different partially engaged) conditions, and a transmission which is shiftable into a plurality of gears. The motor vehicle further comprises means for varying the torque of the prime mover, at least one brake, means for selecting the consumption of energy by the prime mover, and means for actuating the torque transmitting system. The at least one brake and the energy consumption selecting means have idle and operated (activated) conditions, and the actuating means includes means (such as an actor) for engaging the torque transmiting system for the transmission of a torque which entails or causes or brings about a creeping movement of the motor vehicle while the prime mover transmits torque, while the at least one brake and the energy consumption selecting means are idle and while the transmission is in gear, and for reducing the transmission of torque by the torque transmitting system to thus terminate the creeping movement of the motor vehicle in response to operation or actuation or clear-cut intended actuation or operation of at least one component of the motor vehicle.

For example, the at least one component can include the at least one brake.

The means for varying the torque of the prime mover can include means for reducing the torque which is being transmitted by the prime mover on termination of the creeping movement of the motor vehicle. The torque being transmitted by the prime mover can be reduced by a predetermined value; for example, such predetermined value can at least approximate the extent of the reduction of torque transmission by the torque transmitting system to terminate the creeping movement of the motor vehicle.

The means for varying the torque being transmitted by the prime mover can be designed to reduce (in a single step or in a plurality of steps at least two of which can be identical or nearly identical) the magnitude of the torque being transmitted by the prime mover when the transmission of torque by the torque transmitting system is reduced, e.g., in response to a reduction of torque being transmitted by the torque transmitting system. The magnitude (such as the duration and/or length and/or width and/or another relevant parameter) of the aforementioned single step or of one or more steps of a plurality of steps can be selected as a function of the operating point of a component (such as the prime mover and/or the torque transmitting system) of the motor vehicle.

The transmission can be a manually shiftable transmission or an automated transmission; if the transmission is an automatically shiftable transmission, the actuating means for the torque transmitting system (or a discrete actuating means) can comprise adjustable means (e.g., one or more additional actors) for shifting the transmission and means (such as an electric or electronic circuit of the actuating means for the torque transmitting means) for controlling the shifting means.

The means for actuating the torque transmitting system can include means (such as a signal-transmitting connection) for initiating a torque regulating action by the means for varying the torque which is being transmitted or which is to be transmitted by the prime mover.

A further feature of the invention resides in the provision of a method of operating or regulating or controlling the operation of a motor vehicle of the type wherein the power train includes an adjustable energy-consuming prime mover (such as an internal combustion engine) arranged to transmit a variable torque, an automated torque transmitting system (such as a friction clutch) which is actuatable to assume engaged and disengaged (including a plurality of different partially engaged) conditions, and a transmission which is shiftable into a plurality of gears (e.g., into neutral, into reverse and into a plurality of forward gears). The vehicle further comprises means (such as an electric or electronic circuit) for varying the torque of the prime mover, means for actuating the torque transmitting system, at least one brake, and means for selecting the consumption of energy by the prime mover. The at least one brake and the energy consumption selecting means have idle and operated or actuated conditions. The improved method comprises a first step of inducing a creeping movement of the motor vehicle while the at least one brake and the energy consumption selecting means are idle, while the transmission is in gear, and while the prime mover transmits torque. This first step includes engaging the torque transmitting system to transmit a predetermined torque, and the method further comprises a second step of changing the torque being transmitted by the prime mover not prior than in the course of the first step, e.g., in response to completion of the first step or while the first step is being carried out.

The second step can include increasing the torque which is being transmitted by the prime mover; the torque transmitting system can be installed in the power train in such a way that an input element thereof (e.g., a single or a composite flywheel) receives torque from an output element of the prime mover, and that an output element (such as a clutch disc or clutch plate) thereof transmits torque to an input element of the manual or automated transmission.

The method can comprise an additional step of terminating the creeping movement of the motor vehicle, and such terminating step can include disengaging the torque transmitting system and thereafter reducing the torque which is being transmitted by the prime mover of the motor vehicle.

The novel features which are considered as characteristic of the invention are set forth in particular in the appended claims. The improved motor vehicle itself, however, both as to its construction as well as the mode of assembling and operating the same, together with numerous additional important and advantageous novel features thereof, will be best understood upon perusal of the following detailed description of certain presently preferred specific embodiments with reference to the accompanying drawings.

DESCRIPTION OF PREFERRED EMBODIMENTS

Figure 1:
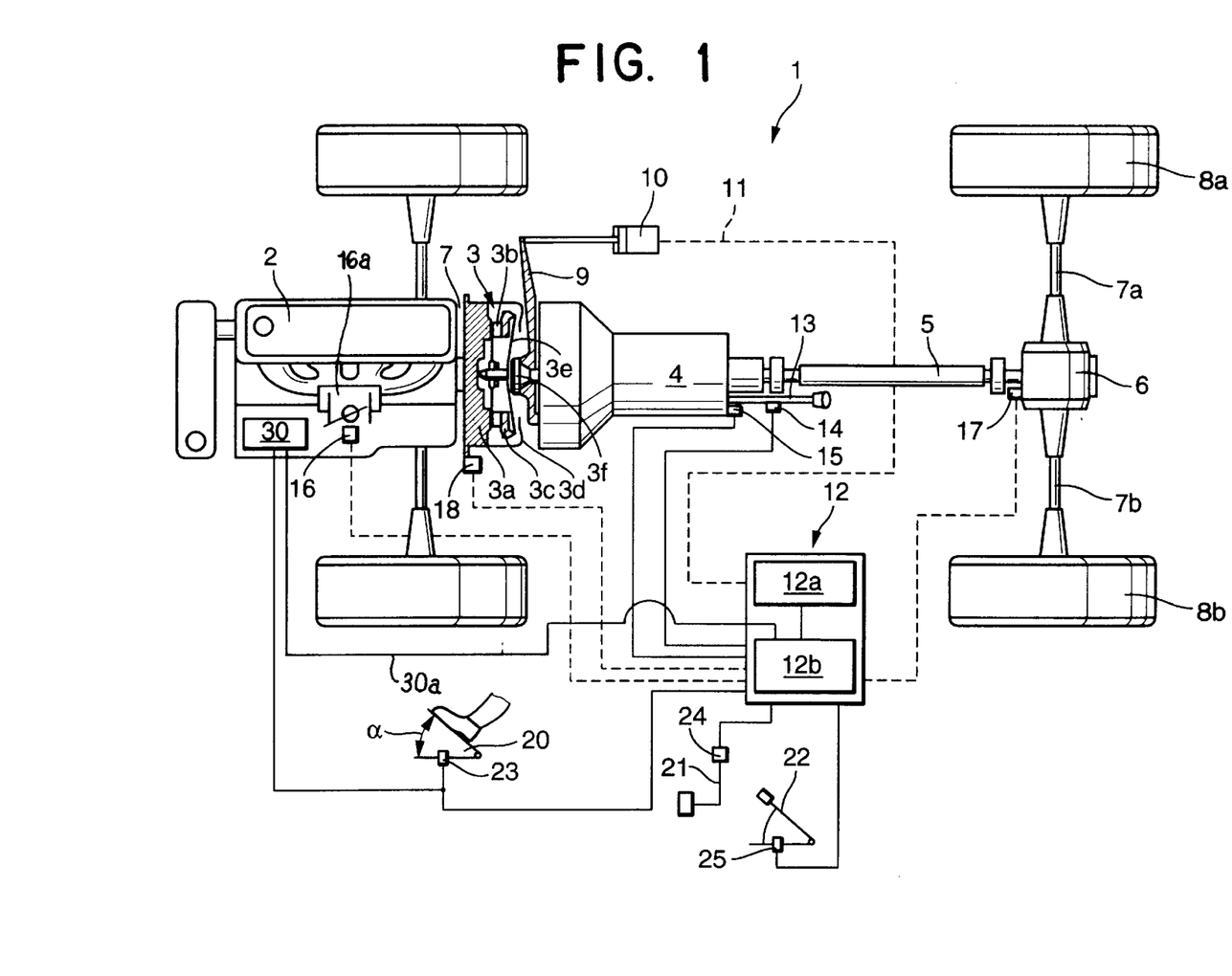
FIG. 1 is a schematic plan view of certain relevant components of a motor vehicle which embodies one form of the present invention.

FIG. 1 illustrates certain relevant component parts of a motor vehicle 1 having a power train including a prime mover 2, an automated torque transmitting system 3, and a manual transmission 4. The transmission 4 normally serves to transmit torque to a driven shaft 5 which, in turn, transmits torque to the input element of a differential 6. The latter can transmit torque to the axles 7a, 7b for the wheels 8a, 8b, respectively. The illustrated automobile has a two-wheel drive; however, the invention can embodied with equal advantage in a motor vehicle having a four-wheel drive.

The automated torque transmitting system 3 which is shown in FIG. 1 is a friction clutch; however, it is equally possible to provide the power train of the motor vehicle 1 with a torque transmitting system in the form of a magnetic powder clutch or a hydrokinetic torque converter employing a so-called bypass or lockup clutch. The friction clutch 3 of FIG. 1 is installed to transmit torque between the output element of the prime mover 2 (such as a crankshaft or a camshaft of an internal combustion engine) and the input element of the transmission 4; however, it is also possible to employ a torque transmitting system which is installed to transmit torque between the transmission 4 and one or more driven units or aggregates, such as the differential 6 and/or an air conditioning unit (not shown). The placing of the friction clutch 3 or an equivalent torque transmitting system downstream of the transmission 4 (as seen in the direction of power flow from the engine 2 to the wheels 8a and 8b, is particularly advantageous if the component 4 is an infintely or continuously variable transmission (CVT).

The friction clutch 3 which is shown in FIG. 1 includes a clutch disc or clutch plate 3b having friction linings which are contacted by an axially movable pressure plate 3c and an engine-driven counterpressure plate 3a when the clutch is engaged to transmit torque between the engine 2 and the transmission 4. The illustrated counterpressure plate 3a is a simple flywheel which is secured to the output element of the engine 2 and to a cover or housing 3d of the friction clutch 3. However, it is also possible to employ a counterpressure plate which is a composite flywheel including coaxial primary and secondary flywheels and one or more torsional vibration damping units between them. Friction clutches employing such composite flywheels are described, for example, in U.S. Pat. No. 4,723,463 (granted Feb. 9, 1988 to Wolfgang Reik et al. for "Assembly for taking up and compensating for torque-induced shocks") the disclosure of which is incorporated herein by reference.

The friction clutch 3 further comprises a clutch spring 3e (such as a diaphragm spring) which clamps the friction linings of the disc 3b between the friction surfaces of the plates 3a, 3c when the clutch is at least partially engaged. The entire clutch 3, including the counterpressure plate or flywheel 3a can be furnished as a preassembled module which is ready to be secured to the output element of the prime mover in a motor vehicle.

The means for engaging and disengaging the friction clutch 3 comprises customary radially inwardly extending resilient tongues or prongs of the clutch spring 3e, a bearing 3f which is adjacent the radially inner portions or tips of such tongues, a pivotable fork-shaped lever 9 outwardly adjacent the bearing, a master cylinder 12a, and a slave cylinder 10 which is connected with the master cylinder 12a by a conduit 11 for a pressurized fluid (e.g., a hydraulic fluid) and has a piston rod connected with the lever 9. The tongues of the clutch spring 3e and the parts 3f, 9 to 11 and 12a can be said to constitute a fluid-operated actor which can change the condition of the clutch 3 and forms part of an actuating apparatus 12 (hereinafter called actuator). This actuator can cause the friction clutch 3 to assume a fully engaged condition (in which the friction linings of the clutch disc 3b are engaged by the friction surfaces of the plates 3a, 3c without any slip) a fully disengaged condition (e.g., a condition in which the friction linings of the clutch disc 3b are not contacted by the plates 3a, 3c so that the output element of the engine 2 and the input element of the transmission 4 can rotate independently of each other), as well as a practically infinite number of partly engaged or intermediate conditions in which the clutch disc 3b transmits torque between the plates 3a, 3c and the input element of the transmission 4 with a more or less pronounced slip. Otherwise stated, the friction clutch 3 can be actuated to transmit torque the magnitude of which can vary between zero and 100 percent. Such selection of the torque to be transmitted between the engine 2 and the transmission 4 is effected by the actuator 12 and is actually carried out by the actor including the parts 3e, 3f, 9 to 11 and 12a.

The illustrated hydraulically or pneumatically operated actor can be replaced with any other suitable actor, e.g., with an electromagnetic actor or with a purely mechanical actor which transmits motion from an electric motor of the actuator 12 to the clutch spring 3e by a system of levers or links and/or by a Bowden wire (not shown) in a manner the exact nature of which forms no part of the present invention. The piston of the master cylinder 12a can receive motion from the aforementioned electric motor of the actuator 12, and the operation of such motor is controlled by a signal evaluating, analyzing and processing electric or electronic circuit 12b of the actuator.

The means for transmitting signals to the circuit 12b of the actuator 12 can include a plurality of sensors of all kinds including switches, meters, monitoring devices, electric circuits and/or electronic circuits. The processed signals are utilized to operate the electric motor for the piston of the master cylinder 12a of the actor forming part of the actuator 12.

The transmission 4 is equipped with a lever 13 which can be manipulated to shift into neutral, into reverse gear or into any one of a selected number (e.g., five) of forward gears. Such manipulation or shifting via lever 13 or in any other suitable way can be carried out by hand or automatically, particularly by the actuator 12 through the medium of at least one second actor which is responsive to signals furnished by the circuit 12b. The lever 13 (or the actor or actors) can be manipulated to select and to shift into or from a particular gear. The actor or actors for shifting an automatic transmission can be operated by a pressurized gaseous or hydraulic fluid or mechanically (e.g., by resorting to a system of levers and/or links and/or one or more Bowden wires) or electromechanically.

It is also possible to provide the actuator 12 with a fluid-operated central clutch engaging/disengaging component.

The means for generating and for transmitting to the circuit 12b signals includes a sensor 14 which monitors the magnitude of the force being applied to the gear shifting lever 13 and/or the position and/or the extent of movement and/or the speed of movement and/or the rate of acceleration of the gear shifting lever 13. For example, the force can be applied by the hand of the operator of the motor vehicle 1. Furthermore, the sensor 14 can be designed to transmit signals denoting that the extent of movement and/or the magnitude of the force being applied to the lever 13 has reached or exceeded a predetermined value (e.g., a value which is indicative of an unequivocal intent to shift the transmission 4 into a different gear and/or to shift into a particular gear). The exact design of the sensor 14 forms no part of the present invention; such design will depend upon the intended or desired function, i.e., on the nature of signals to be generated and transmitted to the circuit 12b. As already mentioned above, such signals can indicate the speed of movement and/or the rate of acceleration and/or the direction of movement and/or the extent of movement of the lever 13 and/or the direction and/or the magnitude of the force being applied to such lever.

FIG. 1 further shows a second sensor 15 which is also installed and designed to generate and to transmit to the circuit 12b signals pertaining to the condition and/or changes of the condition of the transmission 4. For example, the sensor 15 can be set up to generate signals denoting the selected (actual) gear of the transmission 4, i.e., to recognize and to report the momentary or actual condition of the transmission. The sensor 15 can be designed, installed and arranged to monitor the position(s) of one or more component parts in the case of the transmission 4.

A sensor 16 is installed in the motor vehicle 1 to generate and to transmit to the circuit 12b signals denoting the position (such as the inclination) of the mobile part (e.g., a flap) of a throttle valve 16a in or at the engine 2. A further sensor 17 is installed to generate and to transmit to the circuit 12b signals denoting the RPM of the driven shaft 5, of a component part of the differential 6, of at least one of the axles 7a, 7b and/or of at least one of the wheels 8a, 8b. Thus, signals from the sensor 17 can be interpreted as denoting the speed of the motor vehicle 1. An analogous sensor 18 is preferably provided to generate and to transmit to the circuit 12b signals which denote the RPM of the counterpressure plate or flywheel 3a, i.e., the RPM of the output element of the engine 2.

The illustrated sensors constitute but a few of the means for generating and for transmitting signals to the circuit 12b of the actuator 12 for the friction clutch 3. For example, a further sensor can be utilized to monitor the position of at least one door, a sensor can be utilized to generate signals denoting the condition (occupancy or lack of occupancy or setting) of at least one seat in the motor vehicle 1, and a further sensor can be used to transmit to the circuit 12b signals denoting the condition of one or more lights (e.g., whether a parking light and/or any other light is on or off).

The signals (data) furnished by certain sensors (e.g., by the sensor 14 and/or 15) are processed by the circuit 12b, and this circuit can be designed to calculate gradients which can be utilized to indicate the anticipated or impending activity of the operator of the motor vehicle 1, e.g., an intent to shift the transmission 4 into a different gear or into a particular gear. The circuit 12b can be set up to carry out numeric calculations in order to ascertain the aforementioned gradients. The actuator 12 can receive additional data (such as the signals from the sensors 16, 17, 18 and the aforediscussed non-illustrated sensors) as well as additional information pertaining to the momentary condition and/or mode of operation of the motor vehicle 1, and all such information can be processed by the circuit 12b for the generation of output signals which are utilized to operate the actor including the master cylinder 12a, i.e., to select the condition of the friction clutch 3.

An output signal is generated by the circuit 12b when the information being transmitted to such circuit suffices to ascertain that the operator of the motor vehicle 1 actually intends to shift the transmission 4 into a particular gear or into a different gear (such as a gear other than neutral).

When the operator manipulates the lever 13 in order to shift the transmission 4 into a particular gear, the actuator 12 causes its actor to disengage the friction clutch 3. As a rule, this takes place only when the calculated or ascertained engine torque is less than or at most equals a predetermined value. Furthermore, a signal or a set of signals denoting an intent to shift the transmission 4 can be suppressed or disregarded when the ascertained engine torque exceeds the aforementioned predetermined value and, at the same time, the extent of movement of the movable component of the throttle valve 16a or the extent of movement (such as depression) of a gas pedal 20 (namely of the means for selecting the consumption of fuel by the engine 2) exceeds a predetermined value.

FIG. 1 further shows a brake 21 which can be operated by a mobile pedal or otherwise and the position of which is monitored by a sensor 24 connected to an input of the circuit 12b. The position of the gas pedal 20 is monitored by at least one sensor 23, and the position of a parking brake 22 is monitored by a sensor 25. The brake 21 can be used as a standard car brake. The illustrated sensor 23 can be set up to transmit to the circuit 12b signals denoting the inclination (angle a) of the gas pedal 20; in addition, the sensor 23 can be designed to generate and to transmit signals denoting whether or not the gas pedal is being operated at all. For example, the sensor 23 can include or constitute a so-called idling switch which is on when the gas pedal 20 is not operated at all, i.e., which is opened as soon as the gas pedal 20 is depressed. Of course, it is also possible to employ a sensor 23 using a switch which is coded or set up in such a way that it is normally open and is closed in response to depression of the gas pedal 20.

The sensor 24 serves to monitor the position of an operating element (e.g., a pedal) for the brake 21; for example, the sensor 24 can be designed to transmit to the circuit 12*b* signals denoting whether or not the brake 21 is being operated. The sensor 25 for the parking brake 22 can be set up in a similar way, i.e., to transmit to the circuit 12*b* signals which indicate whether or not the brake 22 is in use.

As shown, the sensor 23 for the gas pedal 20 is connected with and can transmit signals to the engine circuit 30, i.e. the circuit 30 can regulate the engine RPM and/or the engine torque as a function of the angle α.

The actually prevailing engine torque can be ascertained by the circuit 12*b* on the basis of signals denoting various monitored positions and/or the condition of one or more relevant components and/or other input values. The effective engine torque is the selected or applied engine torque plus/minus the torque or torques which are supplied or taken up by one or more auxiliary aggregates. Such auxiliary aggregates can include the air conditioning unit and/or one or more other aggregates such as a flywheel between two clutches.

It is also possible to take into consideration drag torques. Of course, is is equally possible to employ the circuit 30 as a means for (independently) selecting the engine torque and to utilize the connection 30*a* for the transmission of signals denoting the thus selected engine torque to the circuit 12*b* of the actuator 12.

The circuit 12*b* can be designed to ascertain whether the signals from various sensors indicate that the operator of the motor vehicle has shifted or intends to shift the transmission 4 via lever 13 (sensor 14 and/or 15), that the gas pedal 20 has been depressed (sensor 23), and that a brake (21 and/or 22) has been operated (sensors 24, 25). Whether or not the signals from the sensor 14 and/or 15 are interpreted (at 12*b*) as denoting an intention by the operator of the motor vehicle 1 to shift the transmission 4 into a different gear or into or from a selected gear depends upon certain other factors, e.g., whether or not the actuator 12 has transmitted a signal to disengage the friction clutch 3 preparatory to shifting into reverse or into one of two, three or more forward gears.

Figure 3:
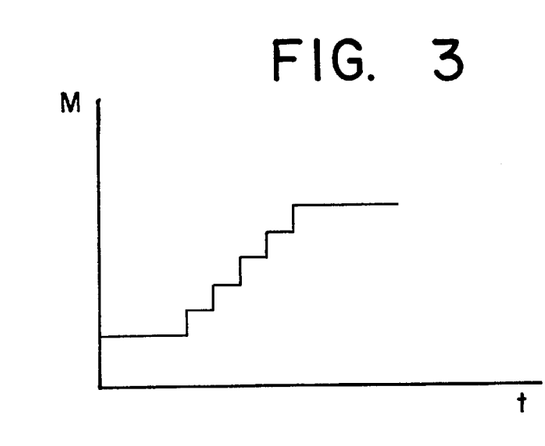
FIG. 3 shows a coordinate system wherein the curve indicates an increase of the torque being transmitted by the engine in a plurality of at least substantially identical steps as a function of time.
Figure 4:
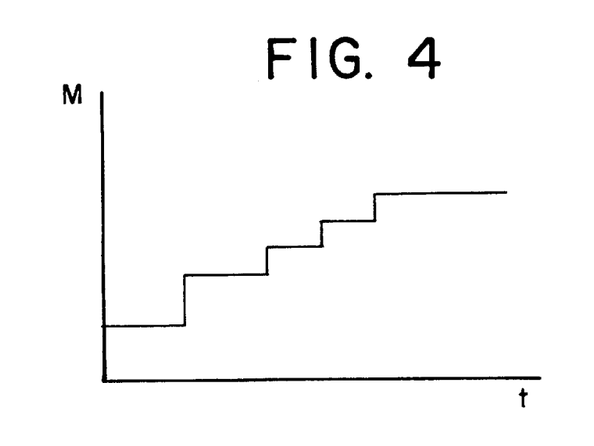
FIG. 4 shows a similar coordinate system but with a curve which indicates an increase of engine torque in several different steps.

If the motor vehicle 1 is at a standstill while the engine 2 is running, while the gas pedal 20 is idle (not depressed), and while the brake 21 is also idle, for example, immediately after the operation of the brake 21 has been interrupted, the actuator 12 engages the friction clutch 3 to such an extent that the motor vehicle begins to creep, i.e., the actuator 12 brings about a more pronounced engagement of the clutch until the vehicle is set in motion at a very low or relatively low (creeping) speed. For example, the torque which is to be transmitted by the friction clutch 3 in response to a signal from the actuator 12 (by way of the actor including the parts 3*e*, 3*f*, 9 to 11 and 12*a*) can be increased from zero to a preselectable value which is required to induce the motor vehicle 1 to proceed with a creeping movement. The torque being transmitted by the friction clutch 3 to initiate a creeping movement of the motor vehicle 1 can be increased in several stages, i.e., in several steps (see FIGS. 3 and 4).

By way of example, the torque being transmitted by the friction clutch 3 starting from a zero value can be increased by means of two linear functions. The term "clutch torque" is intended to encompass or denote that torque which can be transmitted by the friction clutch 3 and can be controlled or regulated by the actuator 12 through the medium of its actor (3*e*, 3*f*, 9 to 11 and 12*a*).

In order to initiate a creeping movement of the motor vehicle 1, the clutch torque must be increased in the following way: The engine torque must be transmitted by the friction clutch 3 at least to such an extent that the transmission 4 can cause the differential 6 and the axles 7*a*, 7*b* to rotate the wheels 8*a*, 8*b* in order to set the vehicle into slow motion (creeping). At such time, the plates 3*a*, 3*b* normally slip relative to the respective friction linings of the clutch disc 3*b* to an extent which is determined by the position of the bearing 3*f* in response to displacement caused by the parts 9 to 11 and 12*a* of the actor forming part of the actuator 12.

During the just described stage of operation of the motor vehicle 1, the engine 2 is running at an idling RPM which is determined by an idling RPM regulator (not specifically shown). Such regulator can form part of the circuit 30 which constitutes a means for varying the torque being transmitted by the engine 2.

The load (stress) upon the engine 2 increases in response to the actuation of the friction clutch 3 in order to induce the motor vehicle 1 to perform a creeping movement; this would normally entail a reduction of the output RPM of the engine 2. The output RPM of the engine 2 is monitored and a corresponding signal is transmitted to the circuit 12*b* by the sensor 18. The character 30*a* denotes an operative connection (such as a data input or any other suitable conductor) between the circuit 12*b* and the engine circuit 30. The connection 30*a* transmits to the circuit 30 signals denoting the condition of the friction clutch 3, i.e., the extent to which the clutch is engaged to induce a creeping movement of the motor vehicle 1 and hence the magnitude of the torque being transmitted to the input element of the transmission 4 via clutch disc 3*b*. In order to avoid a reduction of RPM of the engine 2, the signal from the circuit 12*b* induces the circuit 30 to raise the RPM of the engine. For example, the signal being transmitted from the circuit 12*b* to the circuit 30 via connection or conductor 30*a* can denote the exact magnitude of the torque being transmitted by the friction clutch 3 while the vehicle 1 is in the process of creeping (or is to proceed with such movement), and the circuit 30 processes such signal to raise the engine RPM to a value which suffices to compensate or account for the increased load or stress upon the engine 2 when the friction clutch 3 is partially engaged to induce a creeping movement. Such adjustment of the engine RPM takes place before the idling speed regulator begins to counteract or to compensate for a reduction of the engine RPM such as would be caused by an actuation of the friction clutch 3 to initiate a creeping movement of the motor vehicle 1.

The engine torque can be increased by a value which at least substantially matches the increase of the torque being transmitted by the friction clutch 3 (e.g., from zero) when the clutch is actuated to initiate a creeping movement of the motor vehicle 1. The engine torque can be increased quasi continuously (gradually) or stepwise (refer again to FIGS. 3 and 4). For example, if the engine torque is increased in a stepwise fashion, the width or length of such steps can be selected as a function of the operating point.

The aforediscussed creeping movement of the motor vehicle 1 (such creeping movement takes place in response to appropriate actuation of the friction clutch 3, while the transmission 4 is in gear, and while the gas pedal 20 and the illustrated brakes 21, 22 are idle) is different from that vehicle-starting procedure which is brought about while the operator seeks to accelerate the vehicle by depressing the gas pedal 20 in order to increase the engine RPM from idling RPM to a value within the operating range.

The connection 30a between the circuits 12b and 30 can include a data bus, such as a CAN bus. Moreover, the signal from the circuit 12b to the circuit 30 can denote the real value of magnitude of the clutch torque being transmitted to the transmission 4 while the motor vehicle 1 is in the process of creeping, or a processed value which is to be evaluated by the circuit 30 with a derivative action. This ensures that, if the intensity or another characteristic of the signal being transmitted via connection 30a exceeds that characteristic which is accurately representative of the clutch torque, the circuit 30 can carry out a derivative action or can otherwise compensate for a time delay, for example, with data transmission or by resorting to other procedures such as data evaluation or processing. This ensures that the circuit 30 can set a value which is more accurate than without a derivative action.

The engine torque can be increased simultaneously with or with a delay following an actuation of the friction clutch 3 to initiate a creeping movement of the motor vehicle 1. Moreover, the rate of increase of the engine torque can be more pronounced or less pronounced than that of the clutch torque.

Figure 5:
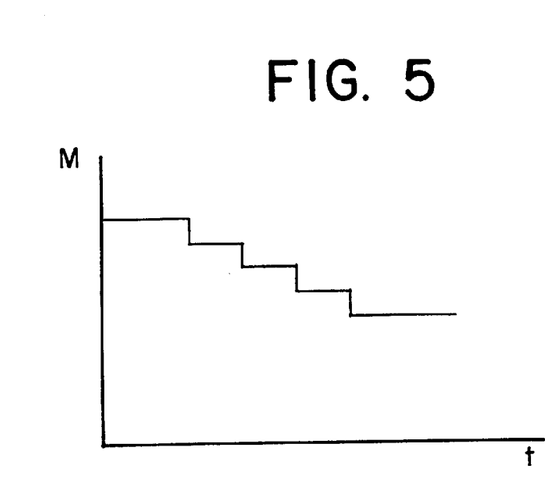
FIG. 5 shows a similar coordinate system but with a curve denoting a reduction of the engine torque in a plurality of at least substantially identical steps.
Figure 6:
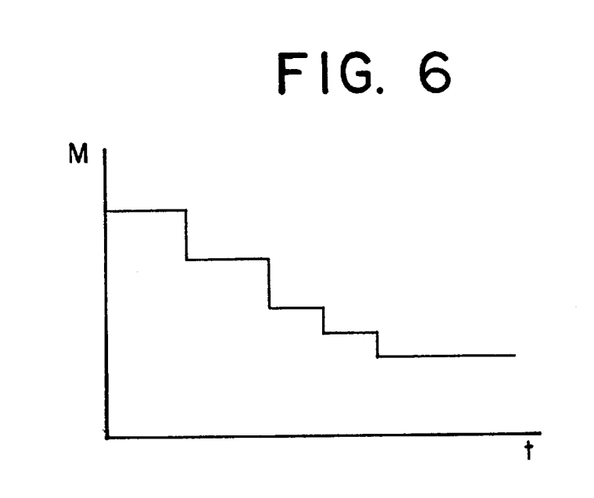
FIG. 6 shows a coordinate system similar to that of FIG. 5, but with a curve denoting a reduction of engine torque in several different steps.

Another feature of the invention resides in the provision of a motor vehicle wherein the regulation of engine torque while the vehicle is in the process of carrying out a creeping movement is effected in such a way that one at least reduces or completely eliminates the likelihood of an undesirable reduction of the RPM of the engine by influencing the circuit 30 via connection 30a, i.e., by signals transmitted by the circuit 12b and being indicative of the selected condition of engagement of the friction clutch or another torque transmitting system. The magnitude of the torque $M_{Mot}$ being transmitted by the engine 2 can be reduced in several identical or nearly identical steps (FIG. 5) or in several different steps (FIG. 6) when the transmission of the torque $M_{Kupp}$ by the clutch 3 is reduced.

As mentioned above, the illustrated manually shiftable transmission 4 can be replaced with an automated transmission or with a transmission which can be shifted manually or automatically. Such transmission can be furnished with a discrete actuator (regulating or control unit) which initiates the shifting into or from selected gears, and such actuator can form part of or can be operatively connected with the actuator 12 for the friction clutch 3. The sensor 14 and/or the sensor 15 can transmit signals to the discrete actuator for the automated transmission and/or to the actuator 12, and the same holds true for some or all of other sensors which are referred to in preceding passages of this specification. It is also possible to provide additional (discrete) sensors for the transmission of signals to a separate actuator for an automated transmission.

Figure 1A:
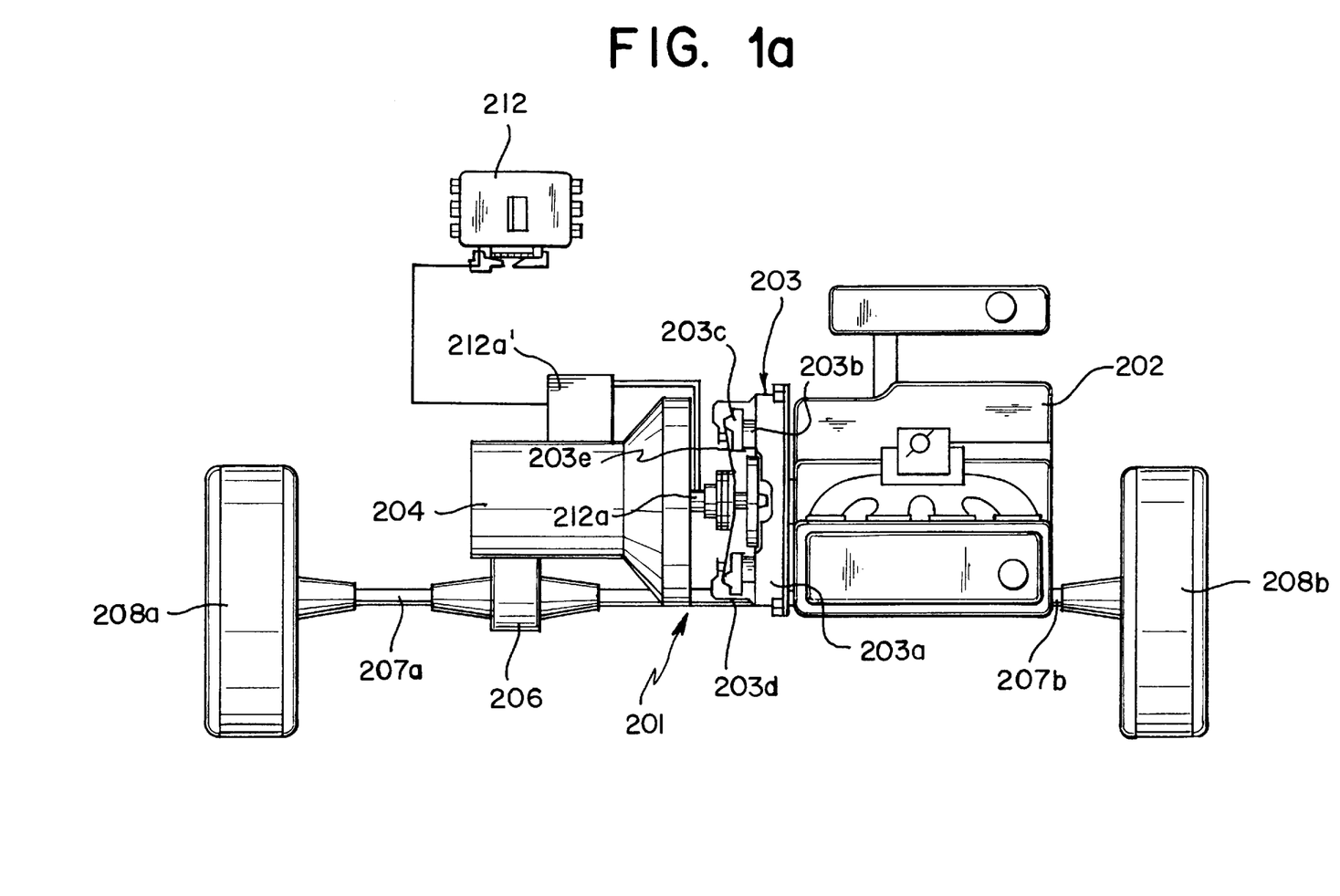
FIG. 1a is a similar schematic plan view but with an actuator which controls the operation of an automated torque transmitting system as well as that of an automated transmission.

If the transmission 4 is replaced with an automated transmission 204 (FIG. 1a), it is presently preferred to provide an integrated actuator 212 (FIG. 1a) which replaces the actuator 12 of FIG. 1 and transmits signals to two actors 212a and 212a' (FIG. 1a), one (212a) for the friction clutch 203 and the other (212a') for the automated transmission 204. Those parts of the motor vehicle 201 of FIG. 1a which are identical with or are clearly analogous to the corresponding parts of the motor vehicle 1 shown in FIG. 1 are denoted by similar reference characters plus 200.

Still further, it is also possible to embody the circuit 30 of FIG. 1 into the actuator 12, or to provide a single actuator which replaces the circuit 30 and the actuator 12 and further includes an actor for an automated transmission (such as the transmission 204 in the motor vehicle 201 of FIG. 1a) replacing the manually shiftable transmission 4. In other words, it is possible to provide a single set of switches, circuits and/or other sensors all of which transmit signals to a single integrated actuator serving to control or regulate the RPM of the engine 2, the extent of engagement of the friction clutch 3 and the shifting of an automated transmission. The just outlined integrated actuator exhibits a number of advantages as concerns the initial cost, the space requirements and reliability of operation. For example, an integrated actuator can be set up to operate in such a way that it takes into consideration all relevant parameters of the engine, of the torque transmitting system and of the transmission as well as any and all other parameters which can influence the operation of such components in the power train of a motor vehicle. This can result in desirable improvements concerning fuel consumption, the emission and composition of combustion products, and/or the performance of the motor vehicle regardless of whether the vehicle is a sports car or a sporty car, a truck, a van, a sedan or another type of motorized conveyance.

Still further, the connection 30a from the circuit 12b to the circuit 30 (or another signal-transmitting connection to the circuit 30) can be employed to ensure that the performance of the engine 2 can be influenced by one or more additional parameters. For example, the torque of the engine 2 can be influenced by the torques of the parts which drive one or more auxiliary units or aggregates such as an air conditioning system, the power steering system and/or others. Thus, the turning on or off of an auxiliary aggregate can be relied upon to induce an increase or a reduction of engine torque.

As utilized herein, the term sports car or sporty car is intended to denote a motor vehicle with a power train which is capable of effecting a pronounced acceleration. For example, the power train of such a motor vehicle can be designed to stand an acceleration which is achieved in response to rapid engagement of the torque transmitting system even if such rapid engagement entails some skidding of the wheels. This can ensure, for example, satisfactory starting of the motor vehicle and/or shifting of the transmission into different gears with high or very hight torque transmission values.

Automated transmissions which can be utilized in the motor vehicle of the present invention, as well as actuators with one or more actors which can be utilized to automatically shift such transmissions into or from selected gears, are disclosed, for example, in commonly owned patent applications Nos. PCT/DE 96 012 92 (filed Jul. 11, 1996) and PCT-DE 96 017 55 (filed Sep. 12, 1996) and in the corresponding U.S. patent application Ser. Nos. 08/816,168 filed Mar. 17, 1997 and 08/836,847 filed Jun. 24, 1997. The disclosures of these U.S. patent applications are incorporated herein by reference. These foreign and U.S. patent applications also disclose the utilization of a common actuator for the torque transmitting system and the automated transmission and/or for the engine and the torque transmitting system and/or for the engine and the torque transmitting system and the automated transmission and/or for the engine and an automated transmission.

As already mentioned hereinbefore, the torque which is being transmitted by the engine 2 to the input element (3a)

of the friction clutch 3 can be increased or reduced in a stepwise fashion. The magnitude (such as as the length or another relevant parameter) of the step or steps can be a function of the operating point, e.g., of the engine or of the friction clutch. The same holds true if the torque which is being transmitted by the friction clutch 3 is to be transmitted in a stepwise fashion. Thus, if the torque being transmitted by the engine 2 or by the friction clutch 3 is increased or reduced in two or more steps, the magnitude of each next following step can match (see FIGS. 3 and 5) or can be different (see FIGS. 4 and 6) from that of the first step. In either event, a change of the torque being transmitted by the engine 2 or by the friction clutch 3 can be effected in a single step of requisite duration, length, width or another parameter.

Another auxiliary aggregate or unit whose torque is derived from or transmitted to the transmission 4 or the friction clutch 3 or the engine 2 can constitute a flywheel which is installed to be operatively connected with the engine by a first clutch and/or with the transmission by a second clutch. This ensures that such flywheel can store energy which is or which can be put to use, for example, to start an idle engine while the motor vehicle is coasting. Such flywheels are known in the art of motor vehicles.

Figure 2:
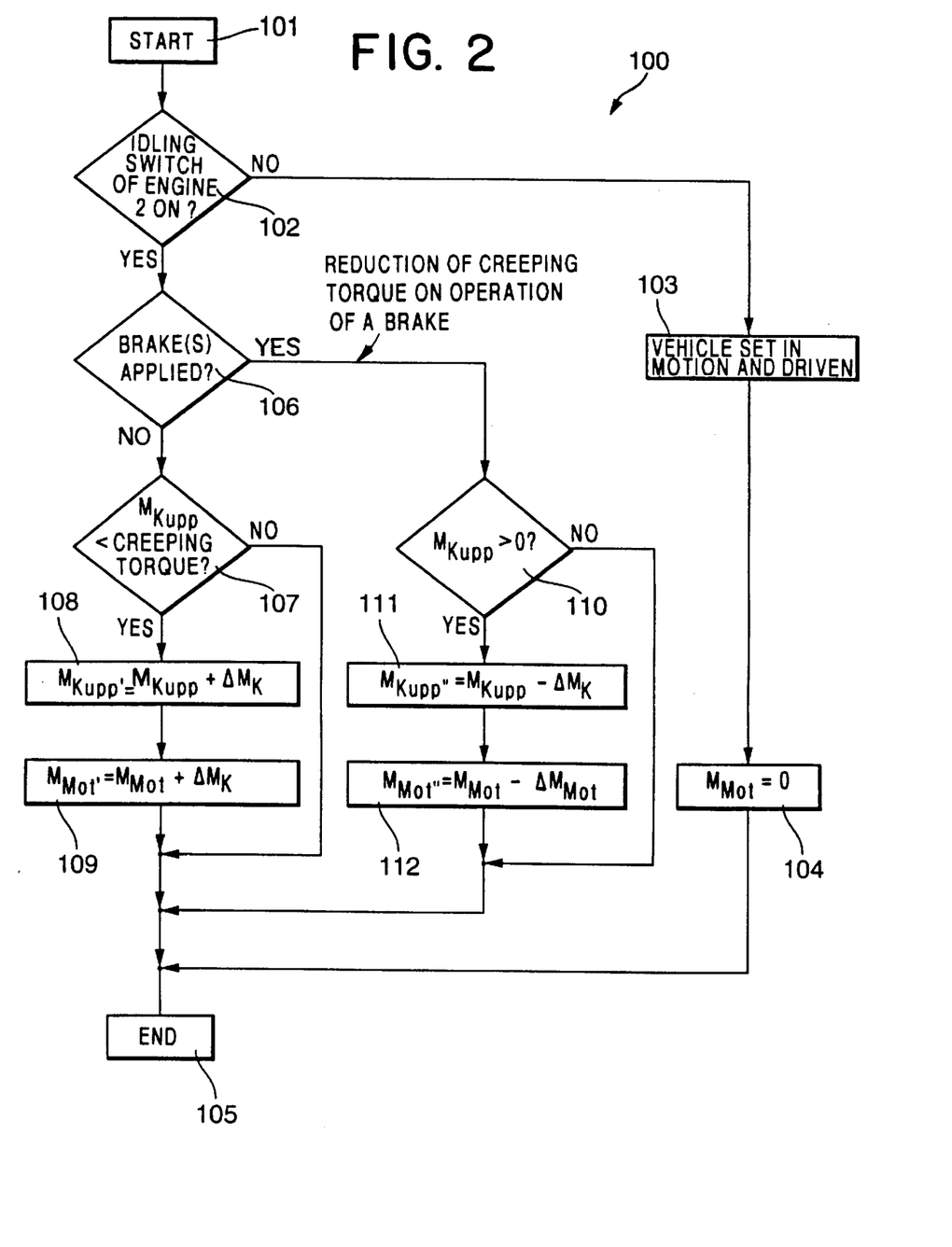
FIG. 2 is a flow chart wherein the blocks denote the steps of certain methods which can be carried out in accordance with the invention.

FIG. 2 shows a flow chart 100 wherein the blocks represent the steps of the novel method which can be practiced or carried out by resorting to the structure of FIG. 1. The routine is started at 101, and the block 102 denotes the step of ascertaining whether or not the idling switch of the engine 2 is on, i.e., whether or not the operator of the motor vehicle 1 is applying foot pressure to the gas pedal 20. If the gas pedal 20 is being depressed while the idling switch for the engine is off, the motor vehicle 1 is set in motion and driven (block 103) and the creeping operation is terminated. The next step (block 104) involves a termination of the increase (if any) of the engine torque by a value $\Delta M_{Mot}$ or the engine torque $M_{Mot}$ is set to zero.

If the step denoted by the block 102 indicates that the idling switch for the engine 2 is on, i.e., that the gas pedal 20 is not depressed, the next step (block 106) involves a determination whether or not at least one brake (21 and/or 22) is in use; this is indicated by signals from the sensor 24 and/or 25. The arrangement is preferably such that the switch 24 and/or 25 is on if the respective brake is idle. If the signals indicate that the brake(s) is(are) not in use, the next step denoted by the block 107) involves a determination whether or not the actually transmittable clutch torque $M_{Kupp}$ is less than the desired or desirable creeping torque. If the clutch torque is less than the creeping torque, the friction clutch 3 is engaged by the actuator 12, i.e., the engagement of the clutch is increased (step 108) so that the newly set clutch torque $M_{Kupp'}=M_{Kupp}+\Delta M_K$. The block 109 denotes the step of selecting that engine torque which is signaled from the circuit 12b to the circuit 30 so that the latter selects a new engine torque $M_{Mot'}=M_{Mot}+\Delta M_K$. Thus, the increase of the engine torque is the same as or commensurate with the increase of clutch torque.

If the step denoted by the block 106 indicates that a brake is applied, the step denoted by the block 110 involves a determination whether the transmittable clutch torque $M_{Kupp}$ exceeds zero. If this is not the case, the routine is terminated at 105. If $M_{Kupp}$ exceeds zero, the clutch torque is reduced (step denoted by the block 111) in such a way that $M_{Kupp''}=M_{Kupp}-\Delta M_K$. The magnitude of the step $\Delta M_K$ during reduction of clutch torque at 111 may but need not be identical with that of the step $\Delta M_K$ at 108. The block 112 denotes the next-following step of reducing the engine torque so that $M_{Mot''}=M_{Mot}-\Delta M_{Mot}$. The routine is terminated at 105.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for motor vehicles and, therefore, such adaptations should and are intended to be comprehended within the meaning and range of equivalence of the appended claims.

What is claimed is:

1. A motor vehicle comprising a power train including an adjustable fuel-consuming prime mover arranged to transmit a variable torque, an automated torque transmitting system actuatable to assume engaged and disengaged conditions, and a transmission shiftable into a plurality of gears, one of said system and said transmission being arranged to transmit torque from said prime mover to the other of said system and said transmission; means for varying the torque of said prime mover; at least one brake; means for selecting the consumption of fuel by said prime mover, said at least one brake and said selecting means having idle and operated conditions; and means for actuating said system, including means for engaging said system for transmission of a predeterminable torque which entails a creeping movement of the vehicle while said prime mover transmits torque, while said at least one brake and said selecting means are idle, and while said transmission is in gear, said means for varying including means for effecting a predetermined increase of the torque being transmitted by said prime mover when said system is engaged to induce said creeping movement of the vehicle.

2. The vehicle of claim 1, wherein said means for engaging said system includes an actor.

3. The vehicle of claim 1, wherein said actuating means includes means for initiating a torque regulating action of said means for varying the torque of said prime mover.

4. The vehicle of claim 1, wherein said selecting means includes a mobile gas pedal.

5. The vehicle of claim 1, further comprising at least one sensor having means for transmitting to said actuating means signals denoting at least one variable parameter.

6. The vehicle of claim 1, wherein said means for engaging includes an actor having means for effecting the transmission by said system of a predetermined torque which entails said creeping movement of the vehicle.

7. The vehicle of claim 1, wherein said predeterminable torque at least approximates the torque being transmitted by said prime mover when said system is engaged to induce said creeping movement of the vehicle.

8. The vehicle of claim 1, wherein said transmission is a manually shiftable transmission.

9. The vehicle of claim 1, wherein said transmission is an automated transmission.

10. The vehicle of claim 9, wherein said actuating means further comprises adjustable means for shifting said automated transmission and means for controlling said shifting means.

11. The vehicle of claim 1, wherein said means for varying is operative to increase the torque being transmitted by said prime mover in a plurality of steps.

12. The vehicle of claim 11, wherein at least some steps of said plurality of steps are at least substantially identical.

13. The vehicle of claim 1, wherein said means for varying is operative to increase the torque being transmitted by said prime mover in at least one step.

14. The vehicle of claim 13, wherein said at least one step has a magnitude which is a function of an operating point of one of said prime mover and said torque transmitting system.

15. A motor vehicle comprising a power train including an adjustable energy-consuming prime mover arranged to transmit a variable torque, an automated torque transmitting system actuatable to assume engaged and disengaged conditions, and a transmission shiftable into a plurality of gears, one of said system and said transmission being arranged to transmit torque from said prime mover to the other of said system and said transmission; means for varying the torque of said prime mover; at least one brake; means for selecting the consumption of energy by said prime mover, said at least one brake and said selecting means having idle and operated conditions; and means for actuating said system, including means for (a) engaging said system for transmission of a torque which entails a creeping movement of the vehicle while said prime mover transmits torque, while said at least one brake and said selecting means are idle, and while said transmission is in gear, and (b) reducing transmission of torque by said system to thus terminate said creeping movement in response to operation of at least one component of the vehicle, said means for varying including means for effecting a predetermined increase of the torque being transmitted by said prime mover when said system is engaged to induce said creeping movement of the vehicle.

16. The vehicle of claim 15, wherein said actuating means includes means for initiating a torque regulating action of said means for varying the torque of said prime mover.

17. The vehicle of claim 15, wherein said at least one component includes said at least one brake.

18. The vehicle of claim 15, wherein said means for varying further includes means for reducing the torque which is being transmitted by said prime mover on termination of said creeping movement.

19. The vehicle of claim 18, wherein the torque being transmitted by said prime mover is reduced by a predetermined value.

20. The vehicle of claim 19, wherein said predetermined value at least approximates the extent of the reduction of torque transmission by said system to terminate said creeping movement.

21. The vehicle of claim 15, wherein said means for varying is operative to reduce, in a plurality of steps, the magnitude of torque being transmitted by said prime mover when the transmission of torque by said system is reduced.

22. The vehicle of claim 21, wherein at least some steps of said plurality of steps are at least substantially identical.

23. The vehicle of claim 15, wherein said means for varying is operative to reduce, in at least one step, the magnitude of torque being transmitted by said prime mover when the transmission of torque by said system is reduced.

24. The vehicle of claim 23, wherein said at least one step has a magnitude which is a function of an operating point of one of said prime mover and said torque transmitting system.

25. The vehicle of claim 15, wherein said transmission is a manually shiftable transmission.

26. The vehicle of claim 15, wherein said transmission is an automated transmission.

27. The vehicle of claim 15, wherein said actuating means further comprises adjustable means for shifting said automated transmission and means for controlling said shifting means.

28. A method of operating a motor vehicle wherein a power train includes an adjustable energy-consuming prime mover arranged to transmit a variable torque, an automated torque transmitting system actuatable to assume engaged and disengaged conditions, and a transmission shiftable into a plurality of gears, one of the torque transmitting system and the transmission being arranged to transmit torque from the prime mover to the other of the torque transmitting system and the transmission, and the vehicle further having means for varying the torque of the prime mover, means for actuating the torque transmitting system, at least one brake, and means for selecting the consumption of energy by the prime mover, the at least one brake and the energy consumption selecting means having idle and operated conditions, comprising:

a first step of inducing a creeping movement of the vehicle while the at least one brake and the energy consumption selecting means are idle, the transmission is in gear, and the prime mover transmits torque, including engaging the torque transmitting system to transmit a predetermined torque; and a second step of effecting a predetermined increase of the torque being transmitted by the prime mover not prior than in the course of said first step.

29. The method of claim 28, further comprising a third step of terminating the creeping movement including disengaging the torque transmitting system and thereafter reducing the torque being transmitted by the prime mover.

* * * * *